United States Patent [19]
Reusser

[11] 3,862,900
[45] Jan. 28, 1975

[54] REMOVAL OF CHEMICALLY COMBINED CHLORINE AND OTHER IMPURITIES FROM HYDROCARBONS

[75] Inventor: Robert E. Reusser, Bartlesville, Okla.

[73] Assignee: Phillips Petroleum Company, Bartlesville, Okla.

[22] Filed: Apr. 9, 1973

[21] Appl. No.: 349,243

[52] U.S. Cl............... 208/262, 208/299, 208/310, 260/652 P, 260/683.41, 260/683.42, 260/683.53, 260/683.57, 260/676 MS
[51] Int. Cl.............................................. C10g 25/04
[58] Field of Search.. 260/676 MS, 674 SA, 683.41, 260/683.42, 683.53, 683.57, 652 P, 676 MS; 208/262, 299, 310

[56] References Cited
UNITED STATES PATENTS

| | | | |
|---|---|---|---|
| 2,882,244 | 4/1959 | Milton | 260/676 |
| 2,956,089 | 10/1960 | Mattox et al. | 260/683.74 |
| 3,045,055 | 7/1962 | Van Pool et al. | 260/683.42 |
| 3,306,945 | 2/1967 | Conviser | 208/310 |
| 3,383,430 | 5/1968 | Hutson et al. | 260/674 |
| 3,732,326 | 5/1973 | Chen | 260/674 |

Primary Examiner—Delbert E. Gantz
Assistant Examiner—C. E. Spresser

[57] ABSTRACT

A method is provided for treating hydrocarbons containing chemically combined chlorine by passing the hydrocarbons through a bed of molecular sieves of effective pore size in the range of 7 to 11 Angstrom units to remove the chemically combined chlorine and other impurities.

6 Claims, No Drawings

REMOVAL OF CHEMICALLY COMBINED CHLORINE AND OTHER IMPURITIES FROM HYDROCARBONS

BACKGROUND OF THE INVENTION

This invention relates to hydrocarbons containing chemically combined chlorine. In one of its aspects, this invention relates to the removal of chemically combined chlorine from hydrocarbons containing the same. In another of its aspects, this invention relates to adsorption techniques. In still another of its aspects, this invention relates to absorbent agents. In one of its concepts, this invention relates to ambient temperature adsorption treatment of hydrocarbons containing chemically combined chlorine to remove chemically combined chlorine from the hydrocarbon.

Hydrocarbon products frequently contain small amounts of chlorine in the form of chemically combined chlorine. In the many processes for producing and treating hydrocarbon products there are many in which small amounts of chemically combined chlorine can be introduced into a hydrocarbon product. Usaully, however, chemically combined chlorine becomes a part of the hydrocarbon product during the reaction in which the hydrocarbon product is produced, because metal chloride catalysts often introduce into the product chlorine which is not removable by water or caustic wash. If chemically combined chlorine is not removed from hydrocarbon products such as gasoline or other fuels, corrosion of engine parts can result and decrease of response to tetraethyl lead or other additives can occur when these hydrocarbon products are used as fuels for internal combustion engines. Similarly, chemically combined chlorine in a solvent such as an electrostatic toner solution can cause interference in the end use of the solvent. I have discovered that chemically combined chlorine along with other contaminants, particularly in relatively small amounts in relation to the total amount of hydrocarbon product, can be effectively removed from a hydrocarbon product.

It is therefore an object of this invention to provide a method for removing chemically combined chlorine from a hydrocarbon or a hydrocarbon mixture. It is also a more specific object of this invention to remove a variety of contaminants from alkylation products catalytically produced by the alkylation of an olefin with an isoparaffin.

Other aspects, concepts and the objects of this invention are apparent from the study of the disclosure and the appended claims.

SUMMARY OF THE INVENTION

According to the invention, chemically combined chlorine is removed from mixtures comprising hydrocarbons and chemically combined chlorine by contacting the mixtures with molecular sieves of effective pore size in the range of 7 to 11 Angstrom units for a time sufficient that the chemically combined chlorine is adsorbed onto the molecular sieves.

In one embodiment of the invention, a hydrocarbon catalytically produced by the alkylation of an olefin with an isoparaffin inthe presence of a metal chloride catalyst is contacted with molecular sieves appropriate for use in this invention for a time sufficient to adsorb chemically combined chlorine, sulfur, odor and color bodies onto the molecular sieve.

In the method of the invention, any suitable means for contacting the molecular sieves with the hydrocarbon containing chemically combined chlorine is suitable. Presently preferred is a system of percolation in which the hydrocarbon to be treated is passed through a fixed bed of molecular sieves in an amount and at a rate that will allow the suitable high utilization of the adsorbent. in general, an impure hydrocarbon containing chemically combined chlorine will be passed through the bed of molecular sieves at an hourly rate of about 0.1 to 5 volume of feed per volume of absorbent. For reasons of economics and efficiency, this range is preferably about 0.5 to 3 volume of feed per volume of absorbent.

Molecular sieves having effective pore size of from about 7 to about 11 Angstrom units can be used in this invention. Zeolite X molecular sieves 10X and 13X commercially available from the Linde Company have effective pore size within this range. Zeolite X molecular sieves are described in U.S. Pat. No. 2,883,244. An example of these molecular sieves is the 13X Zeolite molecular sieve which is described by the formula:

$$Na_{86}[(AlO_2)_{86}(SiO_2)_{106}] \cdot 276H_2O.$$

The hydrocarbon containing chemically combined chlorine treated in accordance with this invention may be obtained from any source. Usually, the hydrocarbon will be obtained from a conversion wherein a metal chloride-containing catalyst and/or promoter is employed, especially an aluminum chloride catalyst promoted with hydrogen chloride. The problem of removing chemically combined chlorine occurs most commonly in the case of alkylation of isoparaffins with olefins — an excellent example of this being the alkylation of isobutane with a mixed olefin stream of ethylene and propylene in the presence of an aluminum chloride-containing catalyst promoted with hydrogen chloride to yield principally diisopropyl. The process of the present invention is applicable, however, to the hydrocarbons produced by other conversions, including isomerization and polymerization among other conversions that yield a hydrocarbon effluent containing chemically combined chlorine. As stated above, the hydrocarbon treated in accordance with the present invention can have acquired this chemically combined chlorine content as a result of a treatment as distinguished from a conversion.

While the chemically combined chlorine is largely organically combined chlorine, there may also be smaller amounts or inorganically combined chlorides such as metal chlorides illustrated by aluminum chloride, sodium chloride, ete., my invention effectively removes the chlorides whether they be organic or inorganic in nature.

Although some chemically combined chlorine can be removed by the process of this invention from hydrocarbons and hydrocarbon mixtures containing relatively large amounts of chemically combined chlorine, it is obvious that the most efficient use of the treatment will be for hydrocarbons containing a relatively small amount of chemically combined chlorine. We have found that when the hydrocarbon feed treated in accordance with this invention contains from about 0.001 to about 0.2 weight percent of chemically combined chlorine measured as chlorine and the process is carried out in the liquid phase by percolation through a bed of appropriately sized molecular sieves at ambient temperature the treatment results in the removal of about 85 percent and often as high as 96 percent of the chemically combined chlorine from the impure hydrocarbon feed.

The following examples show the improved results obtained by the practice of the invention.

EXAMPLE I

Diisopropyl heavy alkylate was made in a catalytic process by reacting a mixed olefin stream of ethylene and propylene with isobutane using aluminum chloride as a catalyst. The total alkylate was first caustic scrubbed and then depropanized and deisobutanized. The light alkylate (B.P. < 280°F.) was fractionated overhead and the diisopropyl heavy alkylate bottoms (B.P. Range of 280°F. to 625°F.) was used as the charge. The charge was a light straw colored liquid, having a strong odor. It also had a low freeze point (<−100°F.), 220 ppm of chloride and 55 ppm of sulfur.

Approximately 100 grams of one-eighth inch spheres of Linde 13X molecular sieves was placed in a one-half inch × 24 inch percolation column and the charge of 250 ml of the diisopropyl heavy alkylate was added to the percolation column and allowed to stand for about one hour and then allowed to slowly percolate through the bed at ambient temperature at a rate of 0.70 V/V/hr.

The percolated product was water clear, odorless and contained 57 ppm chloride amounting to 74.1% removal of chloride.

EXAMPLE II

Fifty six (56) grams of 100–120 mesh 13X molecular sieves was placed in a one-half inch × 24 inch percolation column and approximately 350 ml of diisopropyl heavy alkylate (described in Example I) was percolated through the bed at ambient temperature at a rate of 1.0 V/V/hr.

The percolated product was water clear, odorless, and contained less than 2 ppm Cl amounting to 99.1 percent removal of chloride, and 6 ppm sulfur amounting to 89.1 percent removal of sulfur.

It can be seen from the two examples above that the invention is operable and can be used not only to remove chemically combined chlorine from a hydrocarbon mixture but is also effective in removing sulfur, color bodies, and odor.

Reasonable variation and modification are possible within the scope of the foregoing disclosure and the appended claims the essence of which is that chemically combined chlorine can be removed from hydrocarbons and hydrocarbon mixtures containing chemically combined chlorine by contacting at ambient temperature the contaminated hydrocarbon with molecular sieves having an effective pore size of 7 to 11 Angstrom units.

I claim:

1. A method for removing chemically combined chlorine from a hydrocarbon product mixture produced by the alkylation of an olefin with an isoparaffin in the presence of metal chloride catalyst, said mixture comprising chlorine containing compounds, by contacting said hydrocarbon mixture with an amount of zeolite molecular sieve having an effective pore size of about 7 to about 11 Angstrom units for a time sufficient, at ambient temperature, to adsorb said chemically combined chlorine onto said sieves.

2. A method of claim 1 wherein said hydrocarbon product mixture initially contains 0.2 weight percent or less chemically combined chlorine.

3. A method of claim 1 wherein said contacting is at an hourly rate of contact in volume of hydrocarbon product mixture feed per volume of sieves within the range of about 0.1 to about 5 and said contacting is percolation of said hydrocarbon product mixture through a bed of said sieves:

4. A method of claim 1 wherein said molecular sieves are chosen from among Zeolite 10X and Zeolite 13X molecular sieves.

5. A method of claim 4 wherein said hydrocarbon comprises sulfur, odor and color bodies in addition to chemically combined chlorine, and the sulfur, odor and color bodies are adsorbed by said sieves.

6. A method of claim 4 wherein said hydrocarbons consist principally of diisopropyl.

* * * * *